(12) United States Patent
Kurosawa

(10) Patent No.: US 7,262,982 B2
(45) Date of Patent: Aug. 28, 2007

(54) POWER CONVERSION APPARATUS

(75) Inventor: Ryoichi Kurosawa, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 11/503,135

(22) Filed: Aug. 14, 2006

(65) Prior Publication Data

US 2007/0133235 A1   Jun. 14, 2007

Related U.S. Application Data

(63) Continuation of application No. PCT/JP2005/022961, filed on Dec. 14, 2005.

(51) Int. Cl.
*H02M 1/06* (2006.01)
*H02M 7/521* (2006.01)
*H02P 5/34* (2006.01)

(52) U.S. Cl. .................................. 363/138; 363/136

(58) Field of Classification Search ............... 363/54, 363/56.02, 57, 58, 85, 87, 98, 128, 129, 132, 363/135–138; 318/254, 439, 800, 801
See application file for complete search history.

(56) References Cited

U.S. PATENT DOCUMENTS

| | | | | | |
|---|---|---|---|---|---|
| 4,517,636 | A | * | 5/1985 | Uchino et al. | 363/138 |
| 4,555,752 | A | * | 11/1985 | Kurosawa | 363/68 |
| 5,187,652 | A | * | 2/1993 | Steimer | 363/37 |
| 5,544,035 | A | * | 8/1996 | Beriger et al. | 363/132 |
| 6,219,265 | B1 | * | 4/2001 | Bernet et al. | 363/137 |

FOREIGN PATENT DOCUMENTS

| | | |
|---|---|---|
| JP | 55-106083 | 8/1980 |
| JP | 5-115178 | 5/1993 |
| JP | 5-122936 | 5/1993 |
| JP | 5-236759 | 9/1993 |
| JP | 5-236760 | 9/1993 |
| JP | 6-30568 | 2/1994 |
| JP | 7-222462 | 8/1995 |
| JP | 11-275872 | 10/1999 |

OTHER PUBLICATIONS

"Power Electronics Circuit," compiled by the Institute of Electrical Engineers, the Semiconductor Power Conversion System Research Committee(Nov. 30, 2000), by Ohm Corporation, pp. vi-ix, 137-141, 154-157, and 326.

* cited by examiner

*Primary Examiner*—Matthew V. Nguyen
(74) *Attorney, Agent, or Firm*—Finnegan, Henderson, Farabow, Garrett & Dunner, L.L.P.

(57) ABSTRACT

A power conversion apparatus is formed by connecting unit communication-assisting means in series between an alternating-current terminal incorporated in a conventional current-type power conversion apparatus, and an alternating-current load. The communication-assisting means includes reverse-blocking-type self-commutated devices and a capacitor. By controlling the switching of the reverse-blocking-type self-commutated devices, a voltage is generated at the capacitor and additionally used for a power supply commutation operation or load commutation operation. By virtue of this structure, the power conversion apparatus can easily provide a large capacity (high voltage, large current), and can be improved in power factor. Further, the structure enables the number of required fundamental elements to be reduced, and hence enables the power conversion apparatus to be produced easily at low cost.

9 Claims, 11 Drawing Sheets

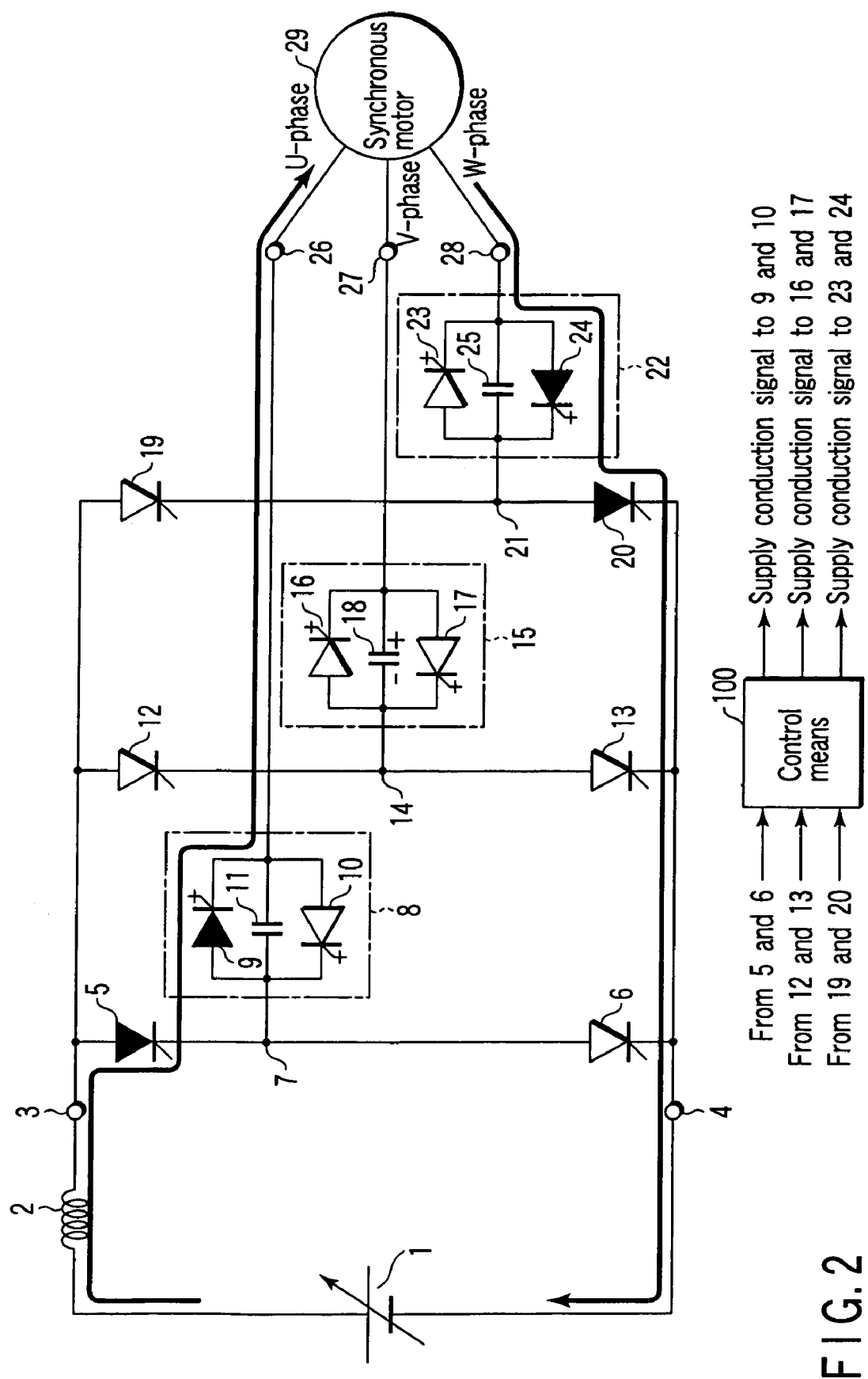
F I G. 2

F I G. 3

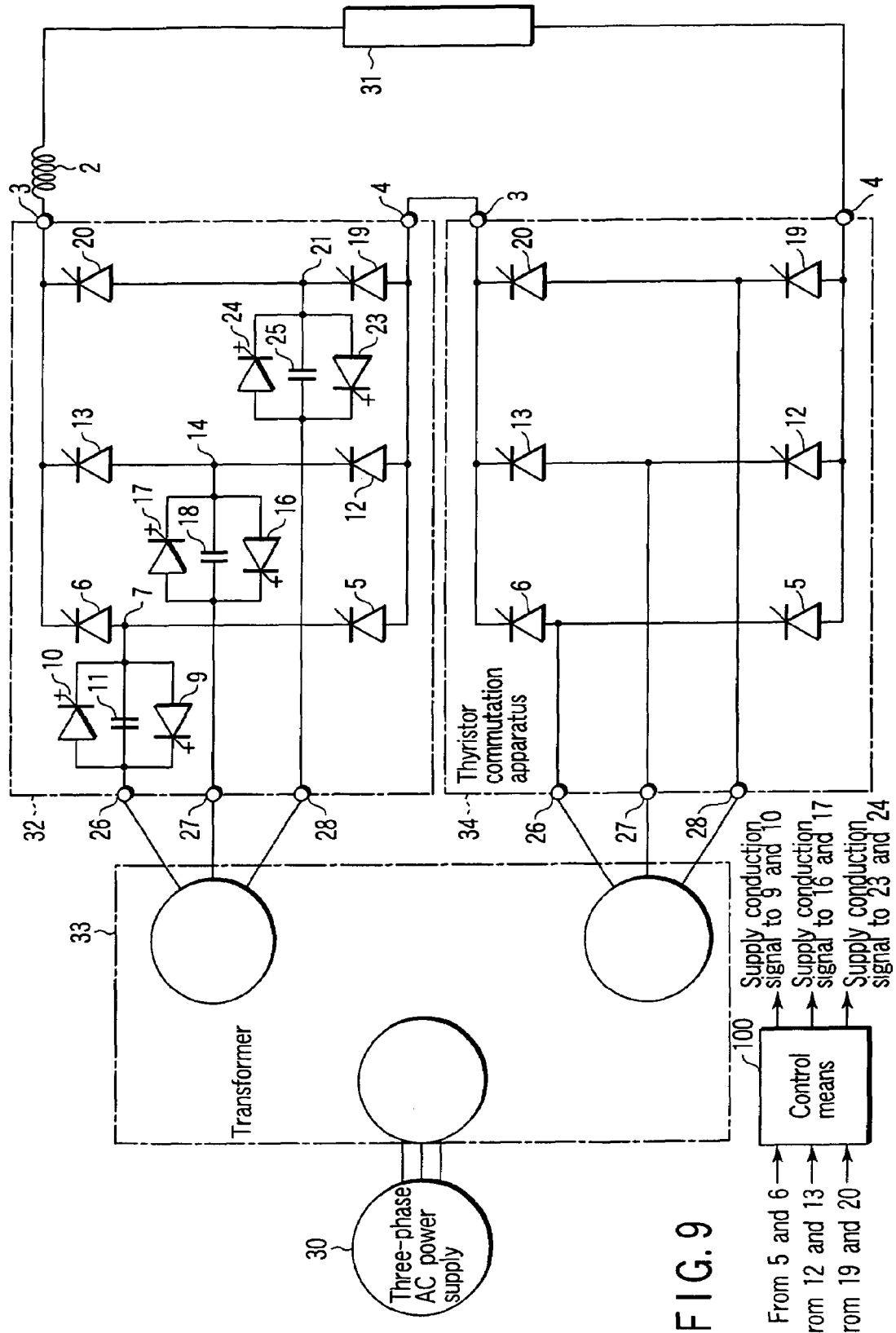
F I G. 9

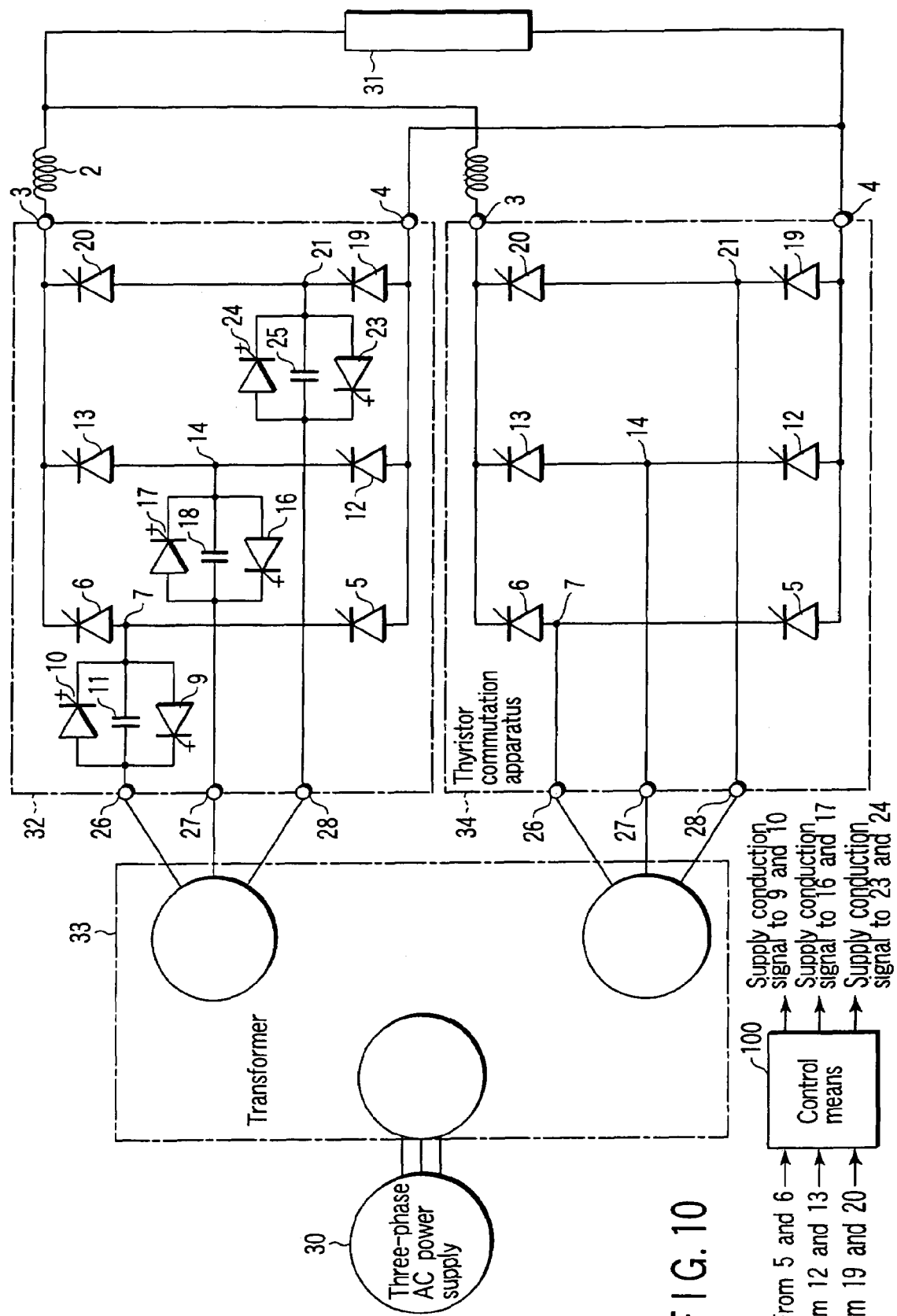
F I G. 10

POWER CONVERSION APPARATUS

CROSS-REFERENCE TO RELATED APPLICATIONS

This is a Continuation Application of PCT Application No. PCT/JP2005/022961, filed Dec. 14, 2005, which was published under PCT Article 21(2) in Japanese.

BACKGROUND OF THE INVENTION

1. Field of the Invention

The present invention relates to a power conversion apparatus for converting a DC power supply from DC power to AC power, or converting an AC power supply from AC power to DC power, and more particularly to a power conversion apparatus capable of easily providing a large capacity (high voltage, large current).

2. Description of the Related Art

Power conversion apparatuses for converting a direct current to an alternating current or an alternating current to a direct current are roughly classified into voltage-type power conversion apparatuses and current-type power conversion apparatuses (see, for example, non-patent document 1 recited below).

The voltage-type power conversion apparatuses are represented by voltage-type inverters, which turn on and off a DC voltage and DC current using a self-commutated device, thereby converting the DC power of a DC power supply to AC power, or the AC power of an AC power supply to DC power.

When the self-commutated device is in the off state, the current is abruptly reduced from, for example, about 1000 A/µs to zero, and the voltage is abruptly increased, thereby generating a surge voltage by the inductance of the circuit. In particular, to realize a large capacity (high voltage, large current), the circuit must be made longer because of high voltage, thereby increasing the inductance and current. Accordingly, it is difficult to realize a large capacity.

The current-type power conversion apparatuses are represented by a thyristor converter for converting the AC power of an AC power supply to a DC power. The ON-timing of the thyristor is controlled in synchronism with the cycle of the AC power supply voltage, whereby the current of the thyristor is made zero by the power supply commutation utilizing the AC power supply voltage, thereby turning off the thyristor.

In this case, although the thyristor can be controlled only when it is in the on state, it has a simple structure and can easily realize high voltage and large current. Further, in a thyristor converter, the rate of change in current when the apparatus is on and off state is about 10 A/µs, and if the apparatus is used as a power conversion apparatus, it can relatively easily provide a large capacity (high voltage, large current).

A load commutation type inverter (also called an LCI) is another typical example of the current-type power conversion apparatus for converting DC power to AC power. This inverter is similar in base structure to the thyristor converter. In this case, however, a synchronous motor is connected as an AC load to the inverter, and the current flowing through the thyristor is made zero, i.e., the thyristor is turned off, by a load commutation based on the induced voltage of the synchronous motor.

The combination of the load commutation type inverter and synchronous motor is called a thyristor motor or thyristor commutatorless motor, which can relatively easily provide a large capacity (high voltage and large current) like the thyristor converter.

In addition, inventions utilizing a self-commutated device as a semiconductor power device in a current-type power conversion apparatus have been made so far (see, for example, the following patent documents 1 to 6).

Non-patent Document 1: "Power Electronics Circuits", p. 137 and p. 155, Compiled by the Institute of Electrical Engineers, the Semiconductor Power Conversion System Research Committee, and Published Nov. 30, 2000 by Ohm Corporation Patent Document 1: Jpn. Pat. Appln. KOKAI Publication No. 5-115178; FIG. 1

Patent Document 2: Jpn. Pat. Appln. KOKAI Publication No. 5-122936; FIG. 1

Patent Document 3: Jpn. Pat. Appln. KOKAI Publication No. 5-236759; FIGS. 1 and 6

Patent Document 4: Jpn. Pat. Appln. KOKAI Publication No. 5-236760; FIG. 1

Patent Document 5: Jpn. Pat. Appln. KOKAI Publication No. 6-30568; FIG. 1

Patent Document 6: Jpn. Pat. Appln. KOKAI Publication No. 7-222462; FIGS. 1 and 3

BRIEF SUMMARY OF THE INVENTION

It is very difficult to provide a large capacity (high voltage, large current) of a voltage-type power conversion apparatus. In contrast, it is relatively easy to provide a large capacity of a current-type power conversion apparatus. The current-type power conversion apparatus is, however, inferior in the power factor of the AC side since it utilizes the power supply commutation or load communication. Further, inventions have been made in which a self-commutated device is used in a current-type power conversion apparatus to improve the power factor. However, they comprise a large number of base structural elements, i.e., have a complex structure.

The present invention has been developed to solve the above problems, and aims to provide a cost-effective power conversion apparatus capable of easily providing a large capacity (high voltage, large current), improved in power factor, and reduced in the number of base structural elements to facilitate its production.

By virtue of the unit communication-assisting means connected in series between the series connection point of the first and second semiconductor power devices, and the alternating-current terminal, the present invention provides a cost-effective power conversion apparatus capable of easily providing a large capacity (high voltage, large current), improved in power factor, and reduced in the number of base structural elements to facilitate its production.

BRIEF DESCRIPTION OF THE SEVERAL VIEWS OF THE DRAWING

FIG. 2 is a circuit diagram illustrating an operation of the power conversion apparatus of FIG. 1;

FIG. 3 is another circuit diagram illustrating another operation of the power conversion apparatus of FIG. 1;

FIG. 9 is a circuit diagram illustrating a power conversion apparatus according to a fourth embodiment of the invention;

FIG. 10 is a circuit diagram illustrating a power conversion apparatus according to a fifth embodiment of the invention.

DETAILED DESCRIPTION OF THE INVENTION

Figure 1:
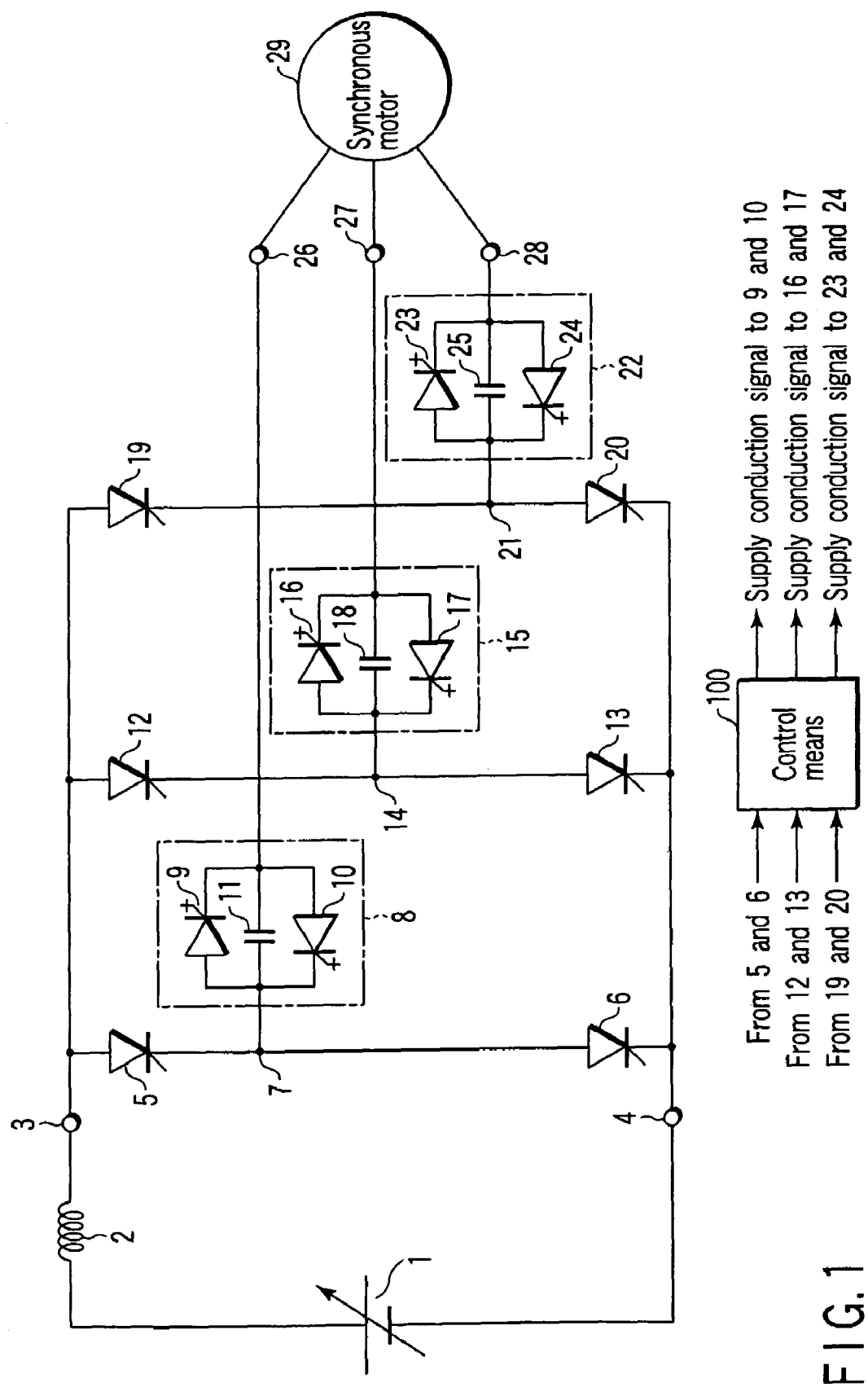
FIG. 1 is a circuit diagram illustrating a power conversion apparatus according to a first embodiment of the invention.
Figure 4:
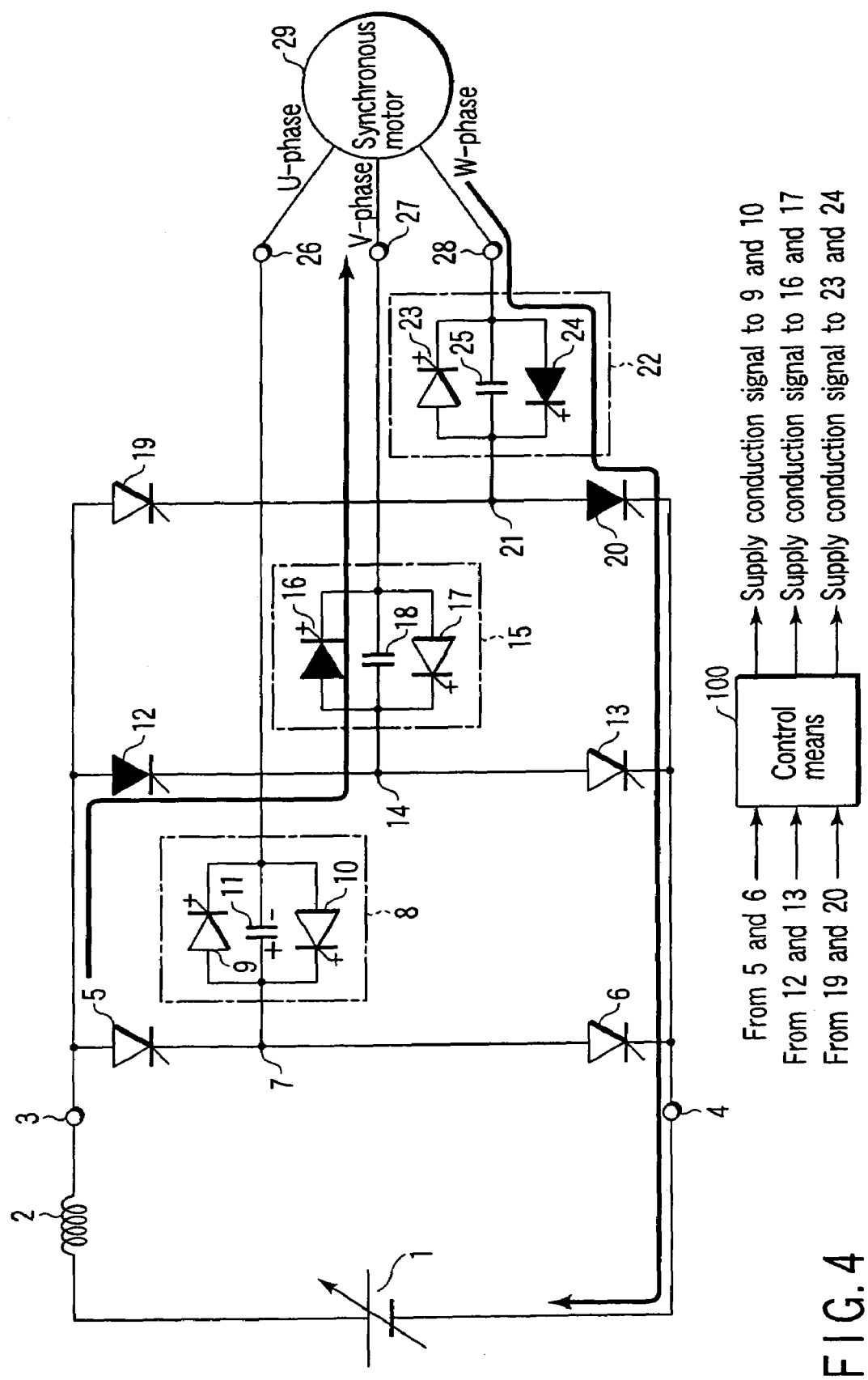
FIG. 4 is yet another circuit diagram illustrating yet another operation of the power conversion apparatus of FIG. 1.

FIG. 1 is a circuit diagram illustrating a power conversion apparatus according to a first embodiment of the invention, which is used as an inverter for converting the DC power of a DC power supply 1 to AC power, the inverter being connected to a synchronous motor 29 as an example of a commutatorless motor, which is used as an AC load.

An inverter is connected between the DC positive terminal 3 and DC negative terminal 4 of a DC power supply 1. This inverter comprises: at least three legs, each leg including an upper arm and lower arm; series circuits of first and semiconductor power devices, e.g., thyristors 5 and 6, 12 and 13, and 19 and 20 connected to the respective legs; connection points 7, 14 and 21 connected in series to the respective thyristors; and AC terminals 26, 27 and 28 connected to the contacts 7, 14 and 21, respectively. The inverter can control the conduction/non-conduction of the thyristors 5, 6, 12, 13, 19 and 20, using a gate control circuit (not shown), thereby converting the DC power of the DC power supply 1 to AC power. A synchronous machine, e.g. a three-phase synchronous motor 29, is connected to the AC terminals 26 to 28 of the inverter. Further, a DC reactor 2 is connected to the connection point of the DC positive terminal of the DC power supply 1 and the thyristor 5. The inverter, which serves as a power conversion apparatus, further comprises commutation-assisting means including the following unit communication-assisting means 8, 15 and 22.

Namely, the unit communication-assisting means 8 is connected between the connection point 7 of the thyristors 5 and 6 and AC terminal 26. Similarly, the unit communication-assisting means 15 is connected between the connection point 14 of the thyristors 12 and 13 and AC terminal 27. Furthermore, the unit communication-assisting means 22 is connected between the connection point 21 of the thyristors 19 and 20 and AC terminal 28. If the unit communication-assisting means 8, 15 and 22 are excluded, the entire structure is similar to that of a conventional commutatorless motor (thyristor motor).

The unit communication-assisting means 8 comprises a chargeable/dischargeable charge element, e.g., a capacitor 11, and first and second self-commutated devices, e.g., reverse-blocking-type self-commutated devices 9 and 10, connected to the capacitor 11 in a back-to-back connection manner. Similarly, the unit communication-assisting means 15 comprises a chargeable/dischargeable charge element,
e.g., a capacitor 18, and first and second self-commutated devices, e.g., reverse-blocking-type self-commutated devices 16 and 17, connected to the capacitor 18 in a back-to-back connection manner. The unit communication-assisting means 22 comprises a chargeable/dischargeable charge element, e.g., a capacitor 25, and first and second self-commutated devices, e.g., reverse-blocking-type self-commutated devices 23 and 24, connected to the capacitor 25 in a back-to-back connection manner. The inverter also comprises control means 100 for controlling, at preset times, the conduction/non-conduction of the self-commutated devices 9 and 10, 16 and 17, and 23 and 24 of the unit communication-assisting means 8, 15 and 22. More specifically, the control means 100 supplies respective conduction signals to the self-commutated devices 9 and 10, 16 and 17, and 23 and 24 at the times shown in FIG. 6 in accordance with conduction signals from the thyristors 5, 6, 12, 13, 19 and 20.

Figure 6:
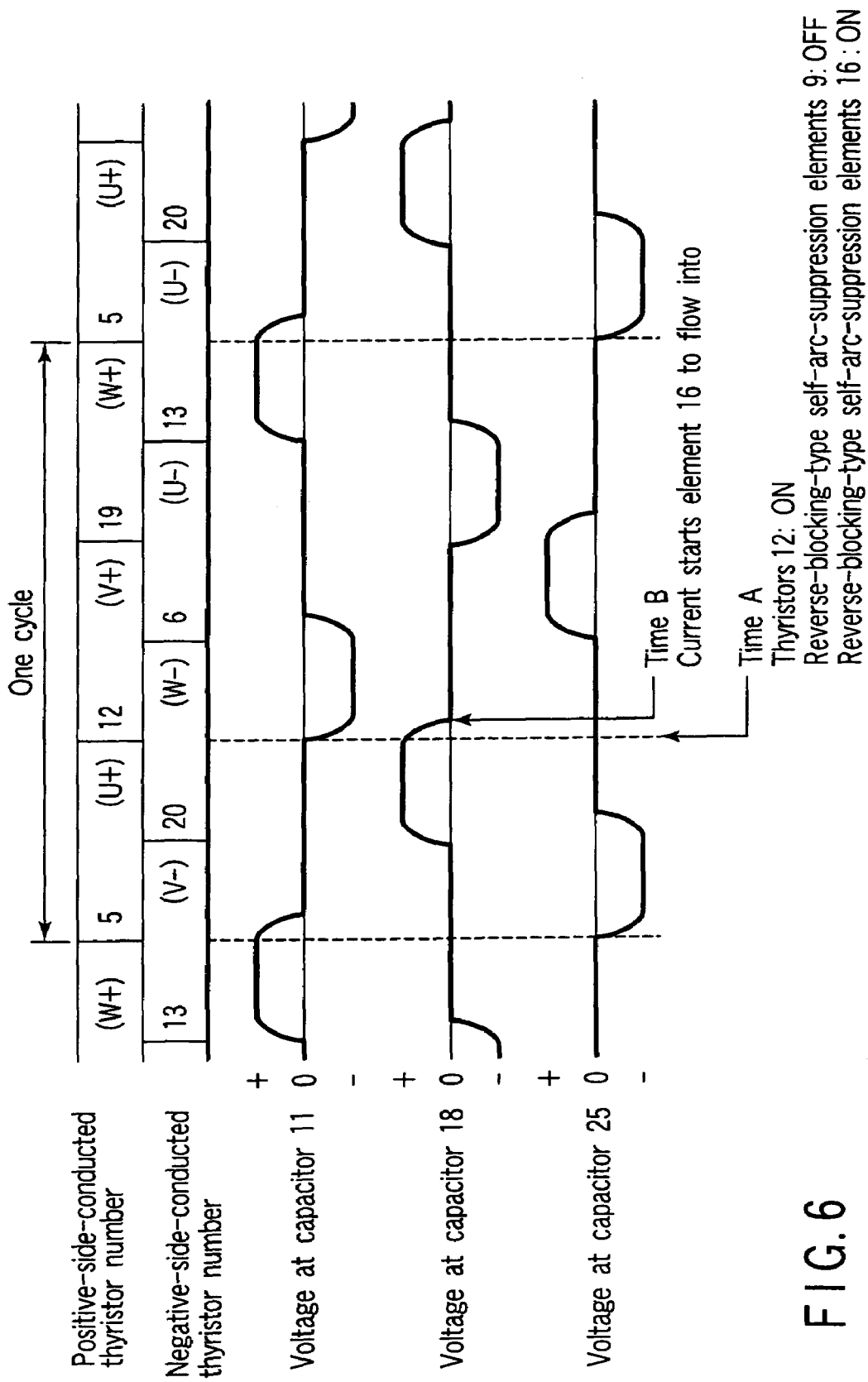
FIG. 6 is a timing chart useful in explaining the operations of the power conversion apparatus of FIG. 1.

During the commutation operation as shown in FIG. 6, the control means 100 makes in a charging state, for example, the capacitor 11 of the unit communication-assisting means 8 that was in the operation state immediately before the commutation operation, and also makes in a discharging state, for example, the capacitor 25 of the unit communication-assisting means 22 that will assume the operation state during the commutation operation. To this end, the control means 100 acquires, as input signals, signals indicating the state, e.g., conduction state, of thyristors 5, 6, 12, 13, 19 and 20.

Referring now to FIGS. 2 to 6, a description will be given of the function and effect of the first embodiment constructed as the above. Assume here that as shown in FIG. 2, a current flows from the DC power supply 1 to the same through the DC reactor 2, DC positive terminal 3, thyristor 5, reverse-blocking-type self-commutated device 9, AC terminal 26, the U-phase and W-phase of the synchronous motor 29, AC terminal 28, reverse-blocking-type self-commutated device 24, thyristor 20 and DC negative terminal 4. Further assume that the AC terminal of the capacitor 18 is set to +.

Figure 3:
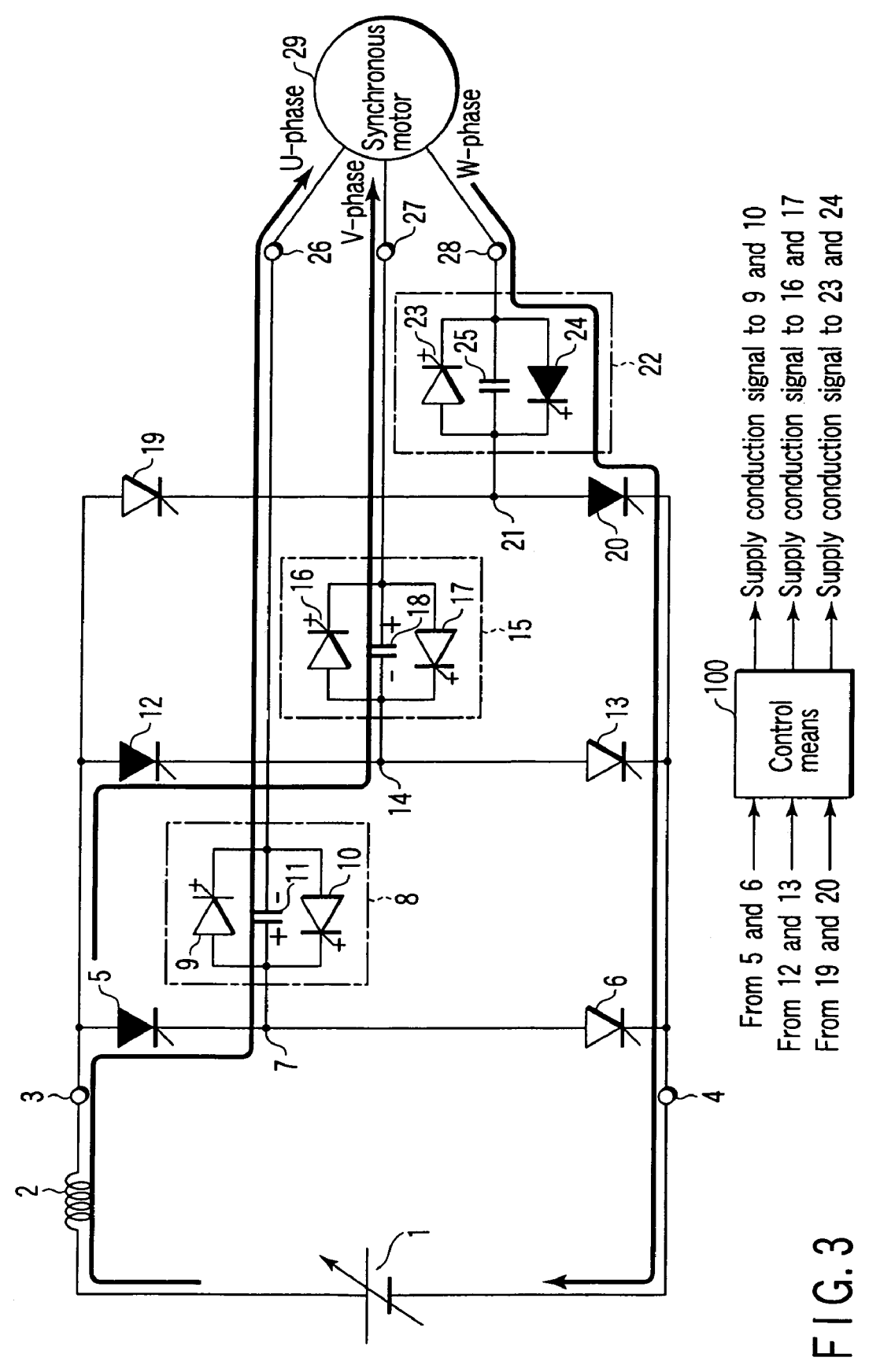

At this time, the flow of current from the thyristor 5 to the U-phase of the synchronous motor 29 is changed to the flow of current from the thyristor 12 to the V-phase of the motor 29. To this end, the thyristor 12 and reverse-blocking-type self-commutated device 16 are turned on, and the reverse-blocking-type self-commutated device 9 is turned off. When the reverse-blocking-type self-commutated device 9 is turned off, a current flows through the capacitor 11 and the series connection point 7 is charged with +, as is shown in FIG. 3.

Further, since the thyristor 12 is turned on, a current flows into the V-phase of the synchronous motor 29 through the capacitor 18. No current flows into the reverse-blocking-type self-commutated device 16 since a reverse voltage is applied thereto.

In the prior art, the commutation from the U-phase current to the V-phase current is caused by the induced voltage difference between the U-phase and V-phase of the synchronous motor 29. In contrast, in the first embodiment of the invention, the commutation is caused by the voltages applied to the capacitors 11 and 18, as well as the induced voltage difference between the U-phase and V-phase of the synchronous motor 29. When the discharge of the capacitor 18 is finished, a forward voltage is applied to the reverse-blocking-type self-commutated device 16, and a current flows into the reverse-blocking-type self-commutated device 16 instead of the flow of current into the capacitor 18.

As described above, as show in FIG. 4, the U-phase current becomes zero and the thyristor 5 is turned off, all current from the DC positive terminal flows through the thyristor 12 and V-phase, the series connection point 7 side of the capacitor 11 is charged with +, and the capacitor 18 is discharged and the voltage at it is reduced to zero volt, which is the end of the commutation operation. During the commutation operation, although the capacitor 18 is discharged, the capacitor 11 is charged and the voltage at it is increased from zero volt. Namely, a substantially constant voltage is applied during the commutation operation.

Figure 5:
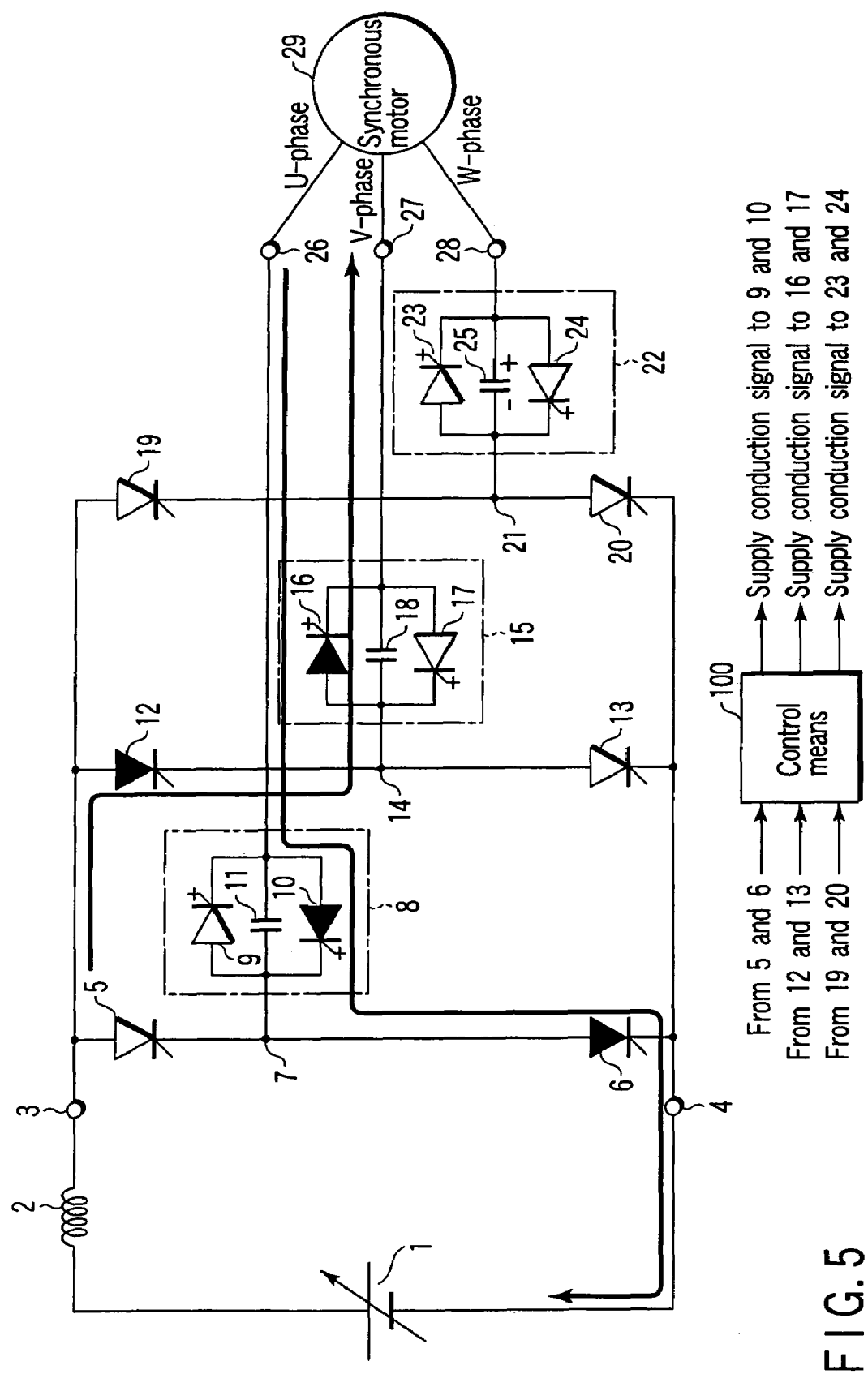
FIG. 5 is a further circuit diagram illustrating a further operation of the power conversion apparatus of FIG. 1.

After that, the flow of current from the W-phase of the synchronous motor 29 to the DC negative terminal 4 via the thyristor 20 is changed to the flow of current from the U-phase of the motor 29 to the terminal 4 via the thyristor 6. To this end, the thyristor 6 and self-commutated device 10 are turned on, and the self-commutated device 24 is turned off. The electricity accumulated in the capacitor 11 as a result of the preceding commutation operation strengthens the commutation effect of the current flowing from the synchronous motor 29. Accordingly, the thyristor 20 is turned off by the same operation as the above-mentioned U-phase to V-phase commutation. Further, as shown in FIG. 5, a current flows to the DC negative terminal via the U-phase, self-commutated device 10 and thyristor 6, the AC terminal 28 side of the capacitor 25 is charged with +, and the capacitor 11 is discharged and the voltage at it is reduced to zero volt, which is the end of the commutation operation.

Thereafter, the flow of current from the thyristor 12 to the V-phase of the synchronous motor 29 is changed to the flow of current from the thyristor 19 to the W-phase of the motor 29. In the preceding commutation operation, the AC terminal 28 side of the capacitor 25 is charged with +, and the present circuit state is equivalent to that acquired when the U-phase, V-phase and W-phase are replaced with the V-phase, W-phase and U-phase, respectively. Accordingly, the thyristor 19 and reverse-blocking-type self-commutated device 23 are turned on, and the reverse-blocking-type self-commutated device 16 is turned off, thereby turning off the thyristor 12 and causing a current to flow from the DC positive terminal through the thyristor 19.

Subsequent to the operations of commutation from the thyristor 5 to the thyristor 9, from the thyristor 20 to the thyristor 6, and from the thyristor 12 to the thyristor 19, the operations of commutation from the thyristor 6 to the thyristor 13, from the thyristor 19 to the thyristor 5 and from the thyristor 13 to the thyristor 20 are performed sequentially. A series of operations is regarded as one cycle and iterated, thereby causing a rectangular-waveform AC current to flow into the synchronous motor 29 as an AC load.

FIG. 6 is a view useful in explaining the above operations. In FIG. 6, U+, for example, indicates the positive direction of the flow of current from the DC positive terminal 3 to the U-phase of the synchronous motor 29, and U−, for example, indicates the negative direction of the flow of current from the U-phase of the synchronous motor 29 to the DC negative terminal 4. Further, "+" concerning the voltage waveforms of the capacitors 11, 18 and 25 indicates that the AC terminal side of each capacitor is charged with +. When a positive-directional current in the U-phase of the motor 29 flows into the V-phase of the motor 29 to thereby turn off the thyristor 5, the capacitor 11 is charged with −. When the thyristor 6 is turned on, the voltage at the capacitor 11 is discharged and used to cause a negative-directional current in the W-phase to flow into the U-phase. Further, when the negative-directional current in the U-phase flows into the V-phase, the capacitor 11 is charged with +, and the voltage at the capacitor 11 is used when the positive-directional current in the W-phase flows into the U-phase.

For explaining the fundamental operation, for example, at time A (in FIG. 6) at which a commutation operation from the thyristor 5 to the thyristor 12, the thyristor 12 and reverse-blocking-type self-commutated device 16 are turned on, and at the same time, the reverse-blocking-type self-commutated device 9 is turned off. However, it is not always necessary to simultaneously turn on and off the elements. If the reverse-blocking-type self-commutated device 9 is more quickly turned off than the turn-on of the thyristor 12, the charge of the capacitor 11 is started earlier, thereby increasing the charging voltage. In contrast, if the reverse-blocking-type self-commutated device 9 is more slowly turned off, the charging voltage can be reduced. Commutation can be controlled by controlling the time of turning off each reverse-blocking-type self-commutated device in accordance with the amount of current, the phase and/or level of the AC voltage, the inductance of the synchronous motor, etc.

Further, a current starts to flow into the reverse-blocking-type self-commutated device 16 at time B in FIG. 6, and it is sufficient if the element is turned on immediately before the start. The time of turn-on of the element 16 can be arbitrarily determined in accordance with the purpose, e.g., the reduction of the loss of the gate circuit, and/or in accordance with the characteristics of the reverse-blocking-type self-commutated device 16.

Furthermore, if all reverse-blocking-type self-commutated devices are kept ON, the commutation-assisting means does not function, the apparatus of the embodiment can be operated in the same way as conventional thyristor apparatuses.

As described above, since the first embodiment of the invention is acquired by interposing the unit communication-assisting means 8, 15 and 22, each formed of a reverse-blocking-type self-commutated device and capacitor, between the AC terminal of a conventional current-type thyristor power conversion apparatus and the synchronous motor 29 as an AC load, the voltages generated at the capacitors 11, 16 and 25 can be added to the induced voltage of the motor 29 that is used for load commutation.

As a result, the first embodiment can provide a highly efficient power conversion apparatus, which can easily realize a large capacity (high voltage, large current), and be improved in power factor and switching loss. This power conversion apparatus is more cost effective, and requires a smaller number of structural elements and hence can be produced more easily, than any other type of power conversion apparatus invented for the same purpose as the above. Further, if the power conversion apparatus of the first embodiment is used instead of conventional power conversion apparatuses, it can be used for various purposes, and can realize large capacity, high power factor and high efficiency. In particular, if a converter, inverter apparatus and synchronous motor, to which the present invention is applied, are combined, a commutatorless motor that can operate with an AC power supply power factor of substantially 1 and a synchronous motor power factor of substantially 1. Thus, the range of applications of the invention is wide, and thus, the invention can provide a significant ripple effect.

To make, 1, the power factor of a synchronous motor incorporated in a conventional thyristor motor, it is necessary to make 0° the commutation advancing angle (in general, expressed by β). In this case, the difference in the induced voltages at the two phases to be subjected to commutation becomes 0, therefore no load commutation function operates, which means that the commutation operation fails and no normal operation can be continued. Further, at the start of the apparatus or a low rotational speed, the induced voltage of the synchronous motor is low, therefore no commutation function can be utilized and some means, such as an intermittent operation for intermittently stopping the supply of current, is required at the DC power supply side. Even in such states as the above in which no load commutation function can be utilized, the unit communication-assisting means 8, 15 and 22 enable commutation, enable a power factor of 1 to be realized, and enable activation and low-speed operation to be achieved without any particular means.

By setting the power factor of the synchronous motor 29 at 1, fluctuation in torque can be minimized, and torque ripple caused by intermittent stop of current supply at the start or low-speed operation can be eliminated.

Furthermore, if the capacitors 11, 18 and 25 of the unit communication-assisting means 8, 15 and 22 are made to have small capacitances to increase the voltages generated at them, an induction motor of a lagging power factor can be used as a load. Thus, the power conversion apparatus of the embodiment can be utilized for various purposes.

Although the reverse-blocking-type self-commutated devices 9, 10, 16, 17, 23 and 24 forcibly cut the current, the capacitors 11, 18 and 25 connected in parallel realize a mode called zero voltage switching (ZVS), which substantially prevents occurrence of surge voltage, and hence causes the voltage to be kept substantially zero during switching, resulting in almost no switching loss. Further, a current starts to flow when the capacitor voltage is substantially zero at which the voltage is inverted. Also for this reason, almost no switching loss occurs.

Figure 7:
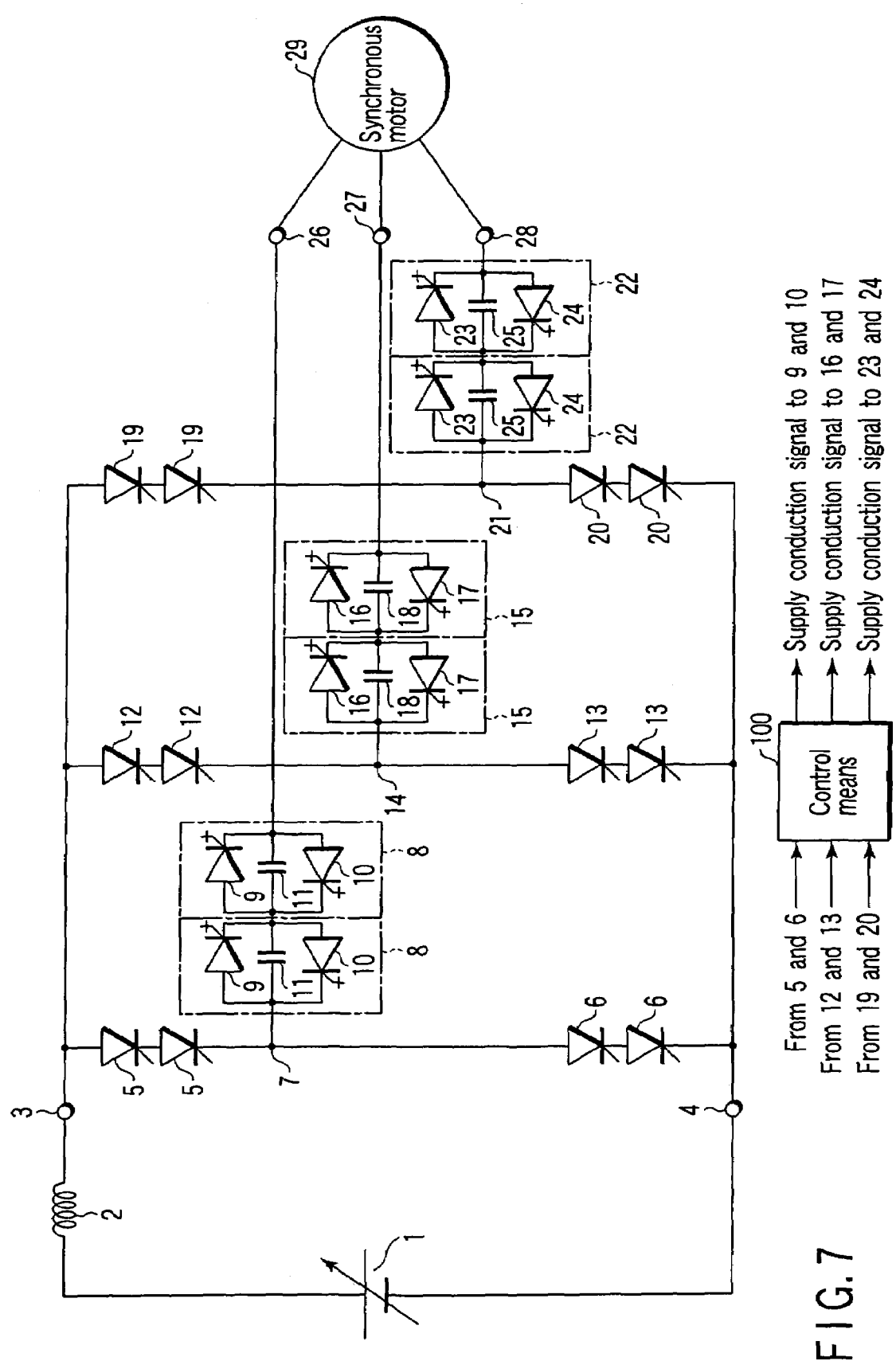
FIG. 7 is a circuit diagram illustrating a power conversion apparatus according to a second embodiment of the invention.

FIG. 7 shows a second embodiment of the invention, in which a higher voltage is generated. In the thyristor power conversion apparatus of the embodiment, to generate a high voltage, each pair of thyristors 5 and 5, 6 and 6, 12 and 12, 13 and 13, 19 and 19, and 20 and 20 are connected in series. Since the switching speed of reverse-blocking-type self-commutated devices is high, if they are connected in series, it is difficult to achieve voltage balance during switching, and therefore it is necessary to increase the wiring length. As a result, surge voltage may well occur.

In the second embodiment, two unit communication-assisting means 8 and 8, two unit communication-assisting means 15 and 15 and two unit communication-assisting means 22 and 22 are prepared, and each pair of unit communication-assisting means are connected in series. Namely, as shown, the two unit communication-assisting means 8 and 8, each formed of the reverse-blocking-type self-commutated devices 9 and 10 connected to the capacitor 11 in a back-to-back connection manner, are connected in series. Similarly, the two unit communication-assisting means 15 and 15, each formed of the reverse-blocking-type self-commutated devices 16 and 17 connected to the capacitor 18 in a back-to-back connection manner, are connected in series. Further, the two unit communication-assisting means 22 and 22, each formed of the reverse-blocking-type self-commutated devices 23 and 24 connected to the capacitor 25 in a back-to-back connection manner, are connected in series. In this case, the rate of change in the currents flowing through the wires between the unit communication-assisting means 8 and 8, between the means 15 and 15 and between the means 22 and 22 is small, therefore even if the wires are lengthened, no surge voltage will occur.

Figure 8:
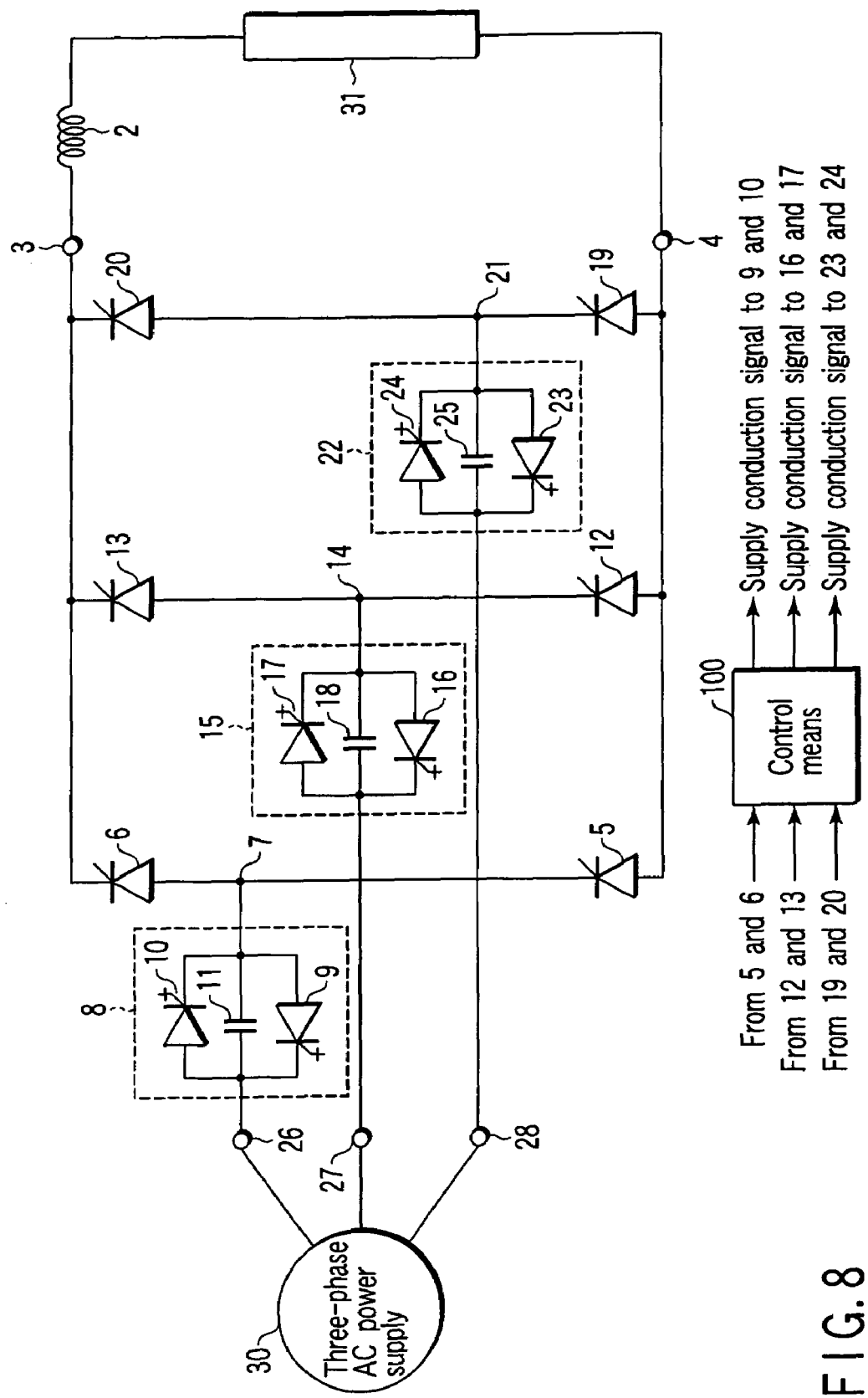
FIG. 8 is a circuit diagram illustrating a power conversion apparatus according to a third embodiment of the invention.

FIG. 8 shows a converter according to a third embodiment of the invention. Although the converter appears different from the structure of FIG. 1, they are quite similar to each other. The former differs from the latter only in that the former employs a three-phase AC power supply 30 instead of the synchronous motor 29, and a DC load 31 instead of the DC power supply 1, and that in the former, the DC positive terminal 3 and DC negative terminal 4 are positioned in a direction opposite to that of the corresponding elements in the latter, with respect to the positions of the thyristors 5, 6, 12, 13, 19 and 20. In a conventional thyristor converter, the firing angle (in general, expressed by α) of each thyristor is controlled within the range of 0° to 180°, thereby controlling the voltage at the DC load 31. In this case, the current flowing into the AC power supply 30 is equal in amplitude to the load current, and the phase of the fundamental wave of the current is retarded by the firing angle α. Thus, a retarded reactive current always flows. In contrast, in the third embodiment, the firing angle α can be set to a negative value, thereby generating an advanced reactive current. If the DC load 31 is formed of a DC reactor, almost only the advanced reactive current can be flown into the three-phase AC power supply 30, with the result that the power supply 30 can be used as a reactive power compensation apparatus (SVC).

FIGS. 9 and 10 show fourth and fifth embodiments of the invention. As shown in these figures, the fundamental structure 32 of the invention is connected to a conventional thyristor converter 34 in parallel or in series, whereby the mutual reactive currents are offset to provide a converter with a power factor of substantially 1. Note that a transformer 33 is interposed between the three-phase AC power supply 30 and the fundamental structure 32.

Figure 11:
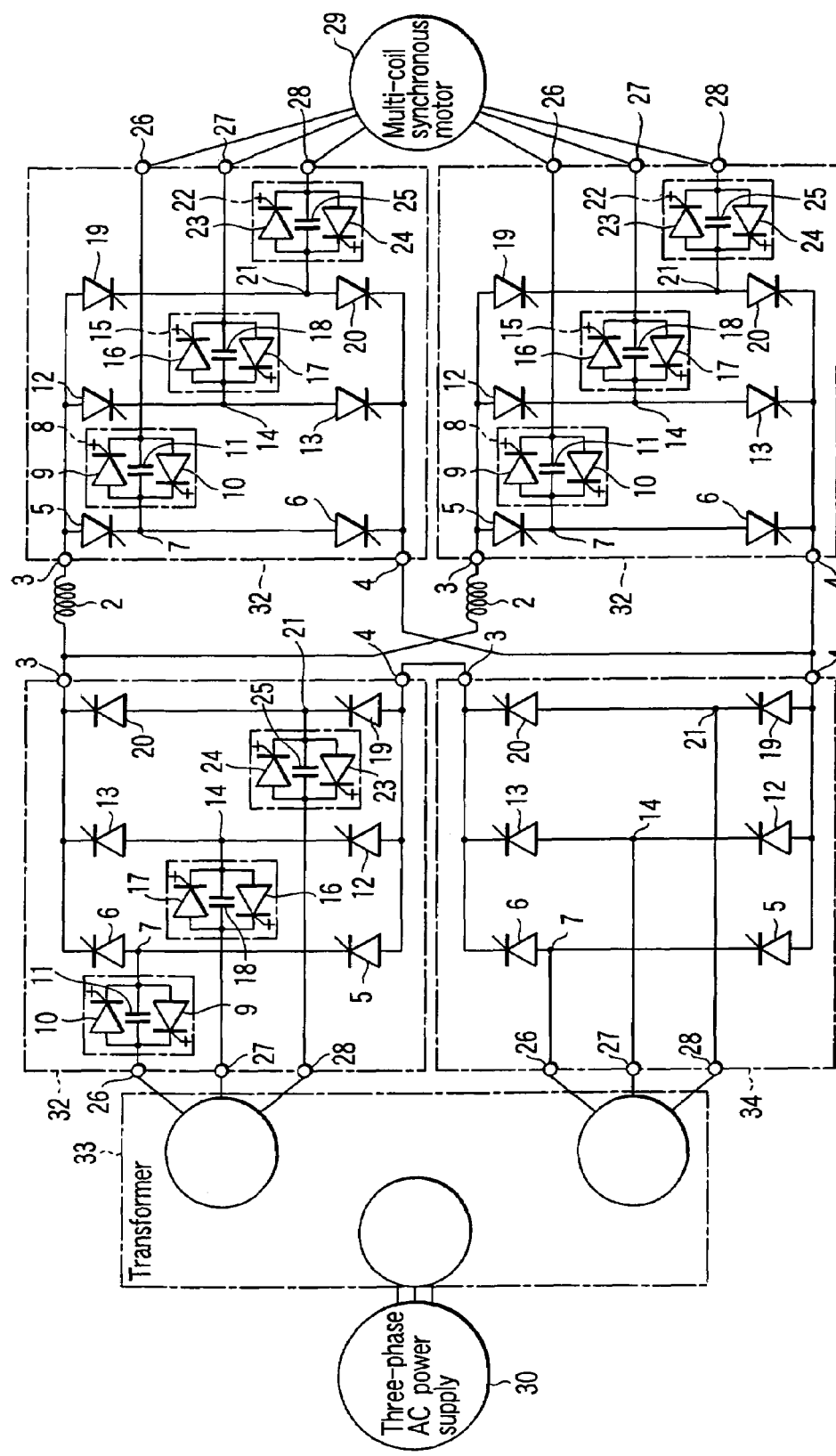
FIG. 11 is a circuit diagram illustrating a power conversion apparatus according to a sixth embodiment of the invention.

FIG. 11 shows a sixth embodiment of the invention. The sixth embodiment is acquired by combining the thyristor converter 34 having the power factor of substantially 1 with the commutator motor of FIG. 1, using a multi-coil synchronous motor. Thus, the commutatorless motor of the sixth embodiment can operate with the power factor of the synchronous motor and the AC power supply set at substantially 1. By virtue of such combination, fluctuation in generated torque can be reduced to an ignorable small range.

(Modification)

The above-described embodiments employ reverse-blocking-type self-commutated devices as the self-extinction elements of the unit communication-assisting means 8, 15 and 22. However, standard reverse-conductance-type self-extinction elements, or combinations of standard reverse-conduction-type self-extinction elements and diodes or thyristors, the components of each combination being connected in series, may be used instead of the reverse-blocking-type self-commutated devices.

Although in the above-described embodiments, thyristors are used as the first and second semiconductor power devices (bulb devices or power semiconductor devices) connected in series in each leg, devices other than the thyristors may be used as the semiconductor power devices.

Further, although in the embodiments, the synchronous motor or induction motor is used as the AC load, a synchronous generator or induction generator may be used as the same.

It is a matter of course that the control means 100 shown in FIGS. 2 to 5 and 7 to 11 has the same function as that of FIG. 1. Further, the control means 100 may be formed integral with the gate control circuit, described in the first embodiment, which controls the conduction/non-conduction of the thyristors 5, 6, 12, 13, 19 and 20.

The present invention can be used as a semiconductor motor such as a thyristor motor, as a commutatorless motor such as a thyristor commutatorless motor, or as a reactive power compensation apparatus.

What is claimed is:

1. A power conversion apparatus comprising at least three legs connected in parallel between a direct-current positive terminal and a direct-current negative terminal, a first semiconductor power device and a second semiconductor power device connected in series to each of the legs, and an alternating-current terminal, each leg including an upper arm and a lower arm, the power conversion apparatus being allowed to convert an alternating current to a direct current, or the direct current to the alternating current, and to supply the converted current to a load connected between the direct-current positive terminal and the direct-current negative terminal, or connected to the alternating-current terminal, wherein at least one unit communication-assisting means is connected in series between a series-connection point of the first and second semiconductor power devices of each leg and the alternating-current terminal, whereby a plurality of unit communication-assisting means are connected to the legs, the plurality of unit communication-assisting means each including a chargeable/dischargeable charge element, and a first self-commutated device and a second self-commutated device which are connected in a back-to-back connection manner with respect to the charge element.

2. The power conversion apparatus according to claim 1, further comprising control means for causing, during a commutation operation, the charge element of one of the plurality of unit communication-assisting means, which was operating immediately before the commutation operation, to assume a charged state, and for causing, during the commutation operation, the charge element of one of the plurality of unit communication-assisting means, which will newly operate during the commutation operation, to assume a discharged state.

3. The power conversion apparatus according to claim 1 or 2, wherein a direct-current power supply or a direct-current load is connected between the direct-current positive terminal and the direct-current negative terminal via a direct-current reactor, and an alternating-current power supply or an alternating-current load is connected to the alternating-current terminal.

4. The power conversion apparatus according to claim 1 or 2, wherein a synchronous motor is connected to the alternating-current terminal, and operated with a power factor of substantially 1.

5. The power conversion apparatus according to claim 1 or 2, wherein the load is an induction device.

6. The power conversion apparatus according to claim 1 or 2, wherein an alternating-current power supply is connected to the alternating-current terminal, and a direct-current reactor is connected between the direct-current positive terminal and the direct-current negative terminal, thereby causing an advanced reactive current to flow from the alternating-current power supply.

7. The power conversion apparatus according to claim 1 or 2, wherein:

a positive terminal and a negative terminal incorporated in a direct-current-output commutator apparatus including a semiconductor power device connected to an alternating-current power supply are connected in series to the direct-current positive terminal and the direct-current negative terminal, respectively;

the alternating-current terminal is connected to the alternating-current power supply; and a power factor of the alternating-current power supply is set to substantially 1.

8. The power conversion apparatus according to claim 1 or 2, wherein:

a positive terminal and a negative terminal incorporated in a direct-current-output commutator apparatus including a semiconductor power device connected to an alternating-current power supply are connected in series, via a direct-current reactor, to the direct-current positive terminal and the direct-current negative terminal, respectively; and a power factor of the alternating-current power supply is set to substantially 1.

9. A power conversion apparatus comprising: an alternating-current power supply; a commutator device including a semiconductor power device and connected to the alternating-current power supply; at least three legs connected in parallel between a direct-current positive terminal and a direct-current negative terminal, each leg including an upper arm and a lower arm; a first semiconductor power device and a second semiconductor power device connected in series to each of the legs; and an alternating-current terminal, the power conversion apparatus being allowed to convert an alternating current to a direct current, or the direct current to the alternating current, and to supply the converted current to a synchronous device connected to the alternating-current terminal, further comprising:

at least one unit communication-assisting means connected in series between a series-connection point of the first and second semiconductor power devices of each leg and the alternating-current terminal, whereby a plurality of unit communication-assisting means are connected to the legs, the plurality of unit communication-assisting means each including a chargeable/dischargeable charge element, and a first self-commutated device and a second self-commutated device which are connected in a back-to-back connection manner with respect to the charge element; and control means for connecting the synchronous device to the alternating-current terminal, causing the synchronous device and the alternating-current power supply to have a power factor of substantially 1, causing, during a commutation operation, the charge element of one of the plurality of unit communication-assisting means, which was operating immediately before the commutation operation, to assume a charged state, and causing, during the commutation operation, the charge element of one of the plurality of unit communication-assisting means, which will newly operate during the commutation operation, to assume a discharged state.

* * * * *